(12) United States Patent
Iwakura et al.

(10) Patent No.: US 7,975,253 B2
(45) Date of Patent: Jul. 5, 2011

(54) POWER SUPPLY NOISE ANALYSIS MODEL GENERATING METHOD AND POWER SUPPLY NOISE ANALYSIS MODEL GENERATING APPARATUS

(75) Inventors: Yoshiyuki Iwakura, Kawasaki (JP); Shogo Fujimori, Kawasaki (JP); Tendou Hirai, Kawasaki (JP); Hitoshi Chida, Kawasaki (JP); Kazuyoshi Kanei, Kawasaki (JP); Koutarou Nimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 545 days.

(21) Appl. No.: 11/864,122

(22) Filed: Sep. 28, 2007

(65) Prior Publication Data

US 2008/0163138 A1    Jul. 3, 2008

(30) Foreign Application Priority Data

Dec. 27, 2006    (JP) .................................. 2006-352084

(51) Int. Cl.
*G06F 17/50*    (2006.01)

(52) U.S. Cl. ......... 716/137; 716/115; 716/120; 716/127

(58) Field of Classification Search .................. None
See application file for complete search history.

(56) References Cited

U.S. PATENT DOCUMENTS

| 6,557,154 B1 * | 4/2003 | Harada et al. ................. 716/115 |
| 7,231,618 B2 * | 6/2007 | Huang et al. ....................... 716/4 |
| 2004/0225487 A1 * | 11/2004 | Iwakura et al. ................. 703/18 |

FOREIGN PATENT DOCUMENTS

| JP | 2004-234618 | 8/2004 |
| JP | 2004-334654 | 11/2004 |

* cited by examiner

*Primary Examiner* — Leigh Marie Garbowski
(74) *Attorney, Agent, or Firm* — Fujitsu Patent Center

(57) ABSTRACT

An object is to simplify a power supply noise analysis model of a circuit board. CAD data of the circuit board is obtained from a CAD apparatus, and overlapping power supply islands among power supply islands existing in different layers of the circuit board are extracted as a power supply pair. Nodes are arranged in the extracted power supply pair, and the nodes of the power supply pair are projected on the power supply islands to which the power supply pair belongs. A mesh region which encloses each node is determined for each power supply island, and impedance (L, R, C) between nodes is calculated. Then, a power supply noise analysis model is created based on the impedance between nodes in each layer, and a capacitance between layers.

10 Claims, 19 Drawing Sheets

● : BOUNDARY LINE NODE ○ : NORMAL NODE

FIRST

POWER SUPPLY PAIR 1    POWER SUPPLY PAIR 2

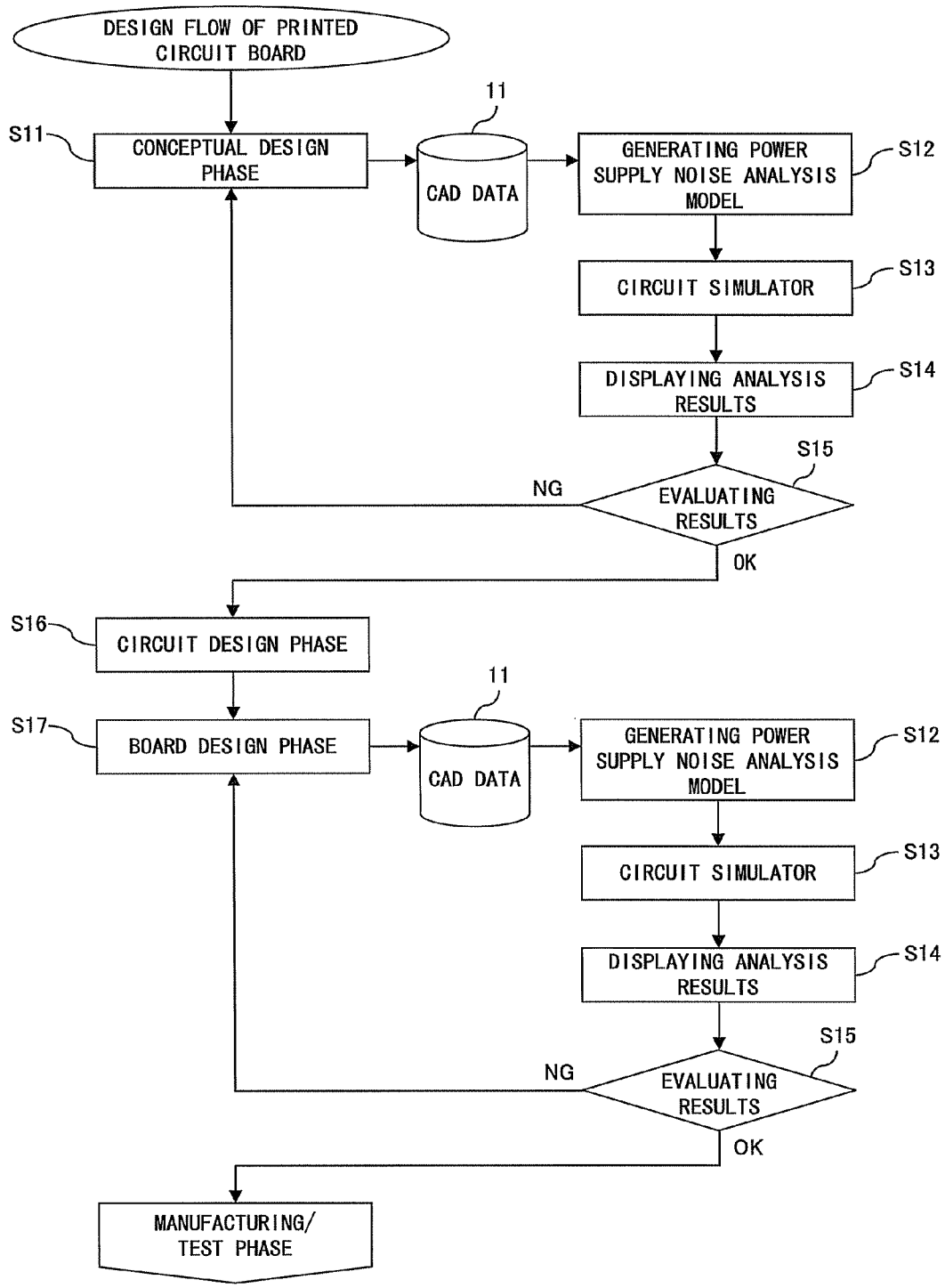
F I G. 5

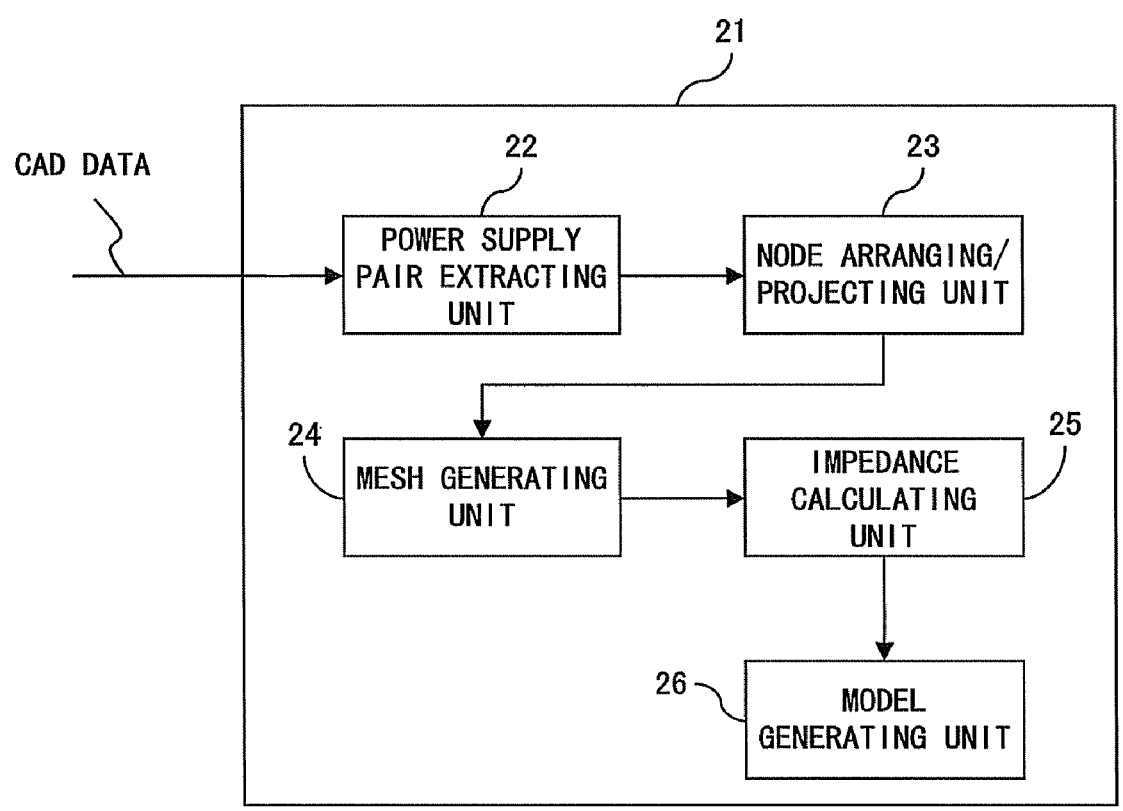
F I G. 6

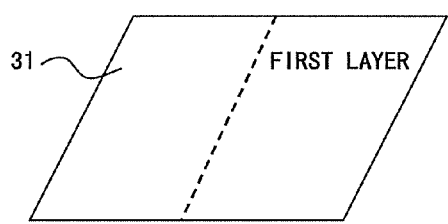
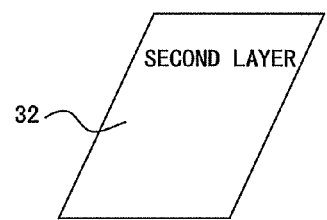
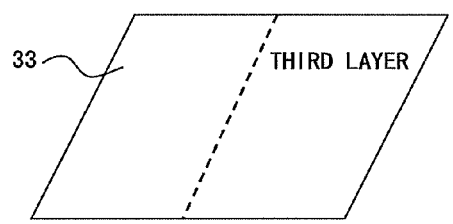
FIG. 10A
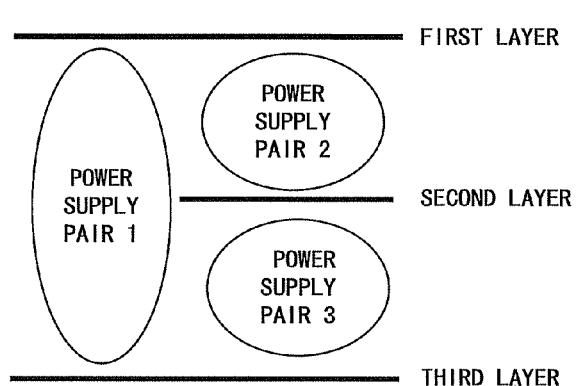
FIG. 10B

NODES OF POWER SUPPLY PAIR 1

NODES OF POWER SUPPLY PAIR 2

NODES OF POWER SUPPLY PAIR 3

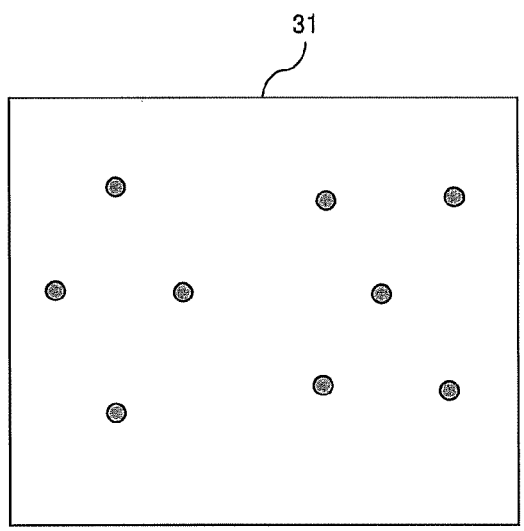
NODES OF POWER SUPPLY ISLAND
IN FIRST LAYER
NODES OF POWER SUPPLY PAIRS 1 AND
2 EXIST
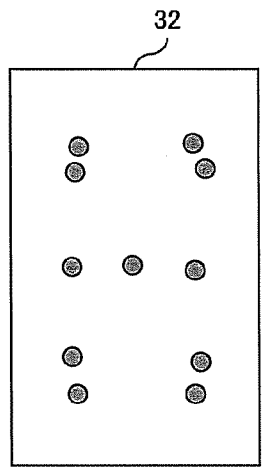
NODES OF POWER SUPPLY ISLAND
IN SECOND LAYER
NODES OF POWER SUPPLY PAIRS 2 AND
3 EXIST
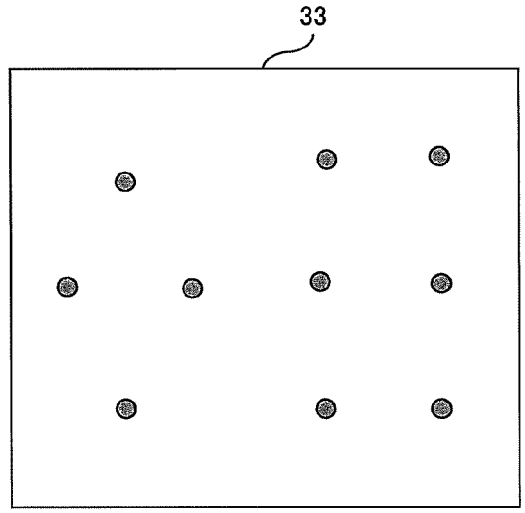
NODES OF POWER SUPPLY ISLAND
IN THIRD LAYER
NODES OF POWER SUPPLY PAIRS 1 AND
3 EXIST
F I G. 1 2

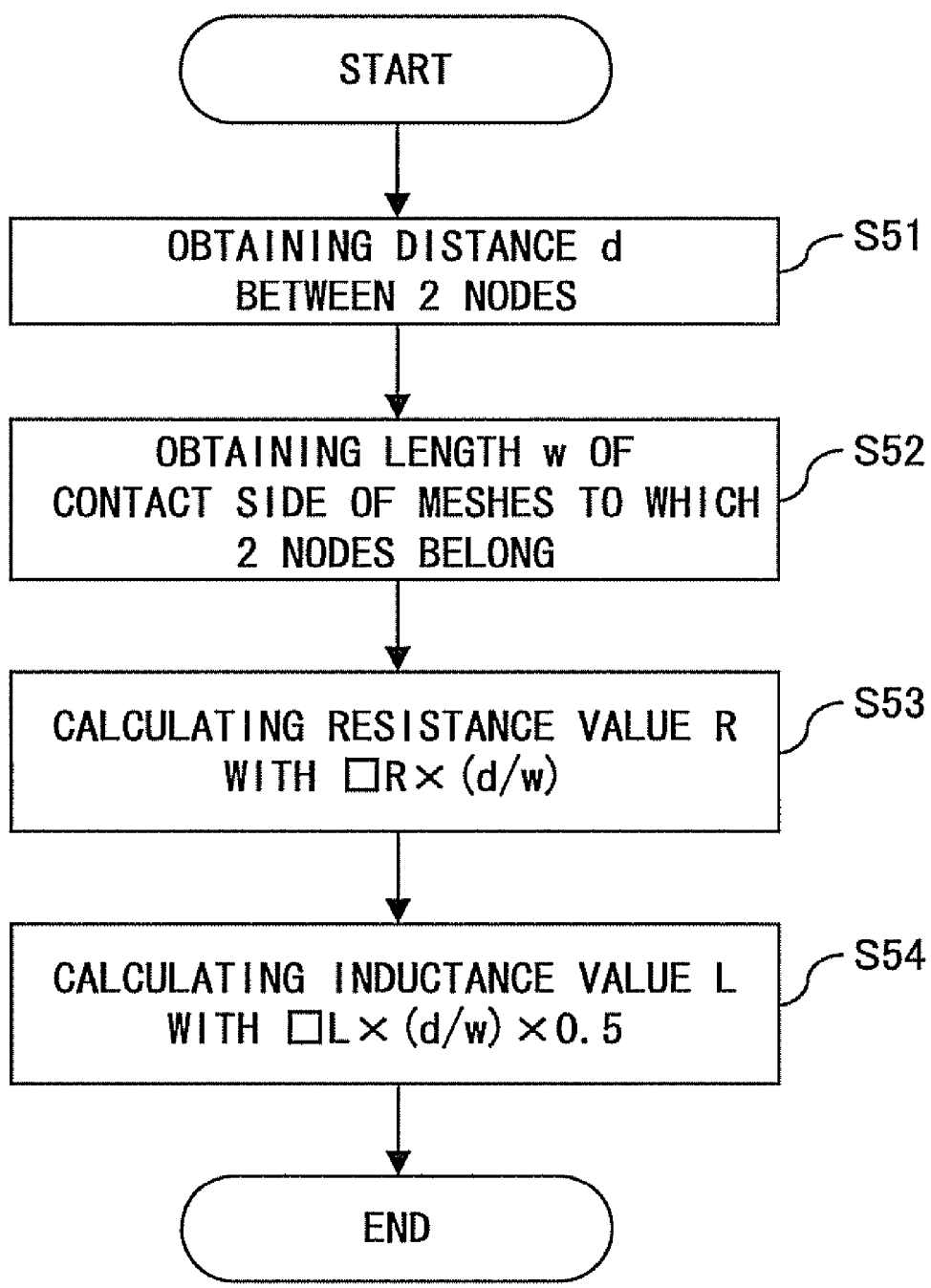
F I G. 13

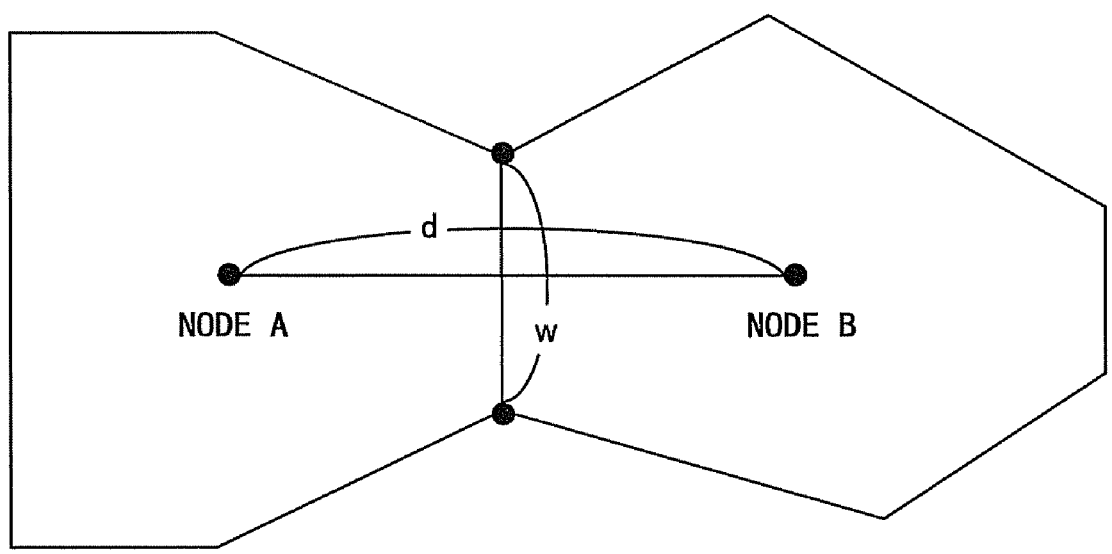
F I G. 1 4

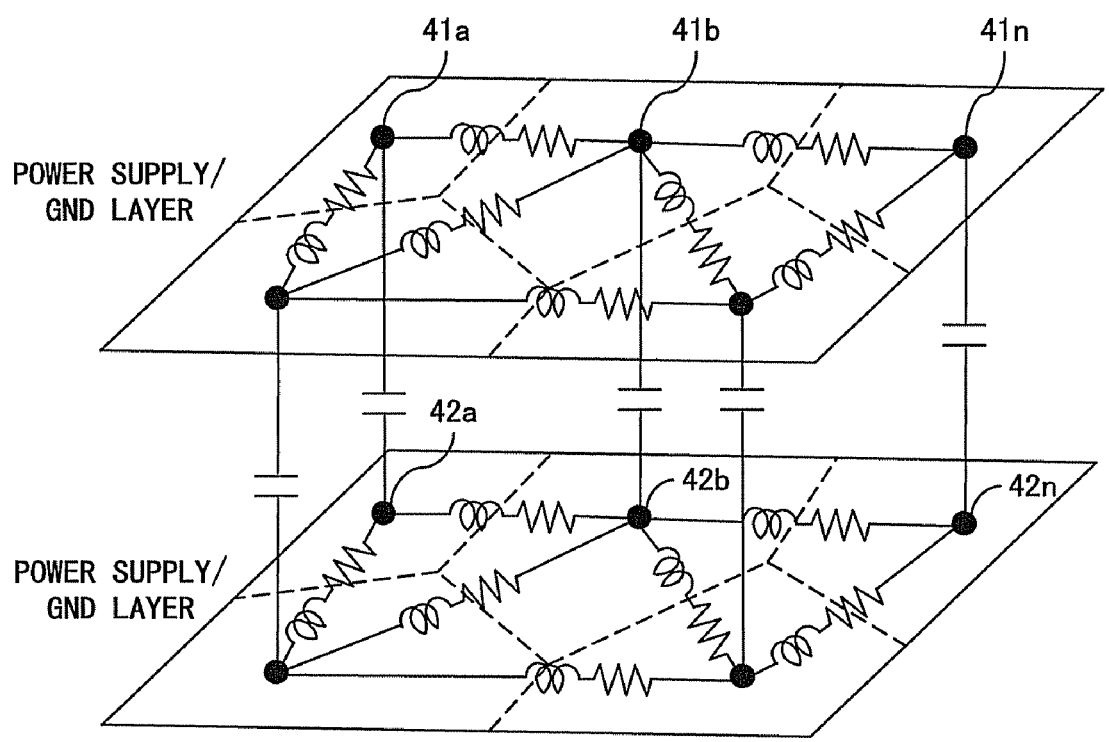
F I G. 15

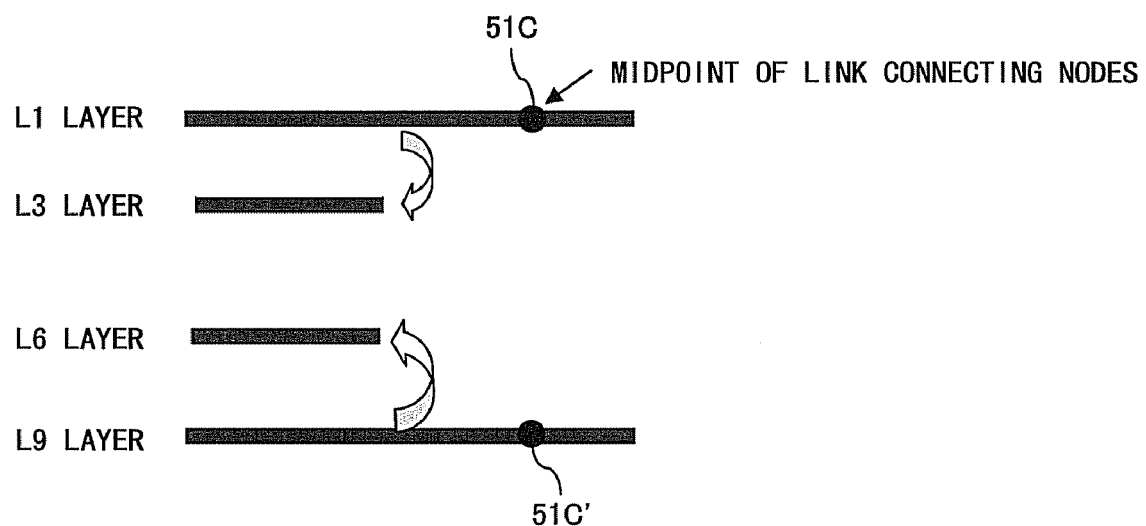
F I G. 1 9

POWER SUPPLY NOISE ANALYSIS MODEL GENERATING METHOD AND POWER SUPPLY NOISE ANALYSIS MODEL GENERATING APPARATUS

CROSS REFERENCE TO RELATED APPLICATIONS

This application is based on and hereby claims priority to Japanese Application No. 2006-352084 filed on Dec. 27, 2006, the contents of which are hereby incorporated by reference.

BACKGROUND OF THE INVENTION

1. Field of the Invention

The present invention relates to a method for generating an analysis model for analyzing power supply noise of a circuit board, a power supply noise analysis model generating apparatus, and a recording medium on which a program thereof is recorded.

2. Description of the Related Art

With an increase in the density of elements mounted on a circuit board, the density of an electric current of a power supply unit has been significantly growing. Additionally, the operating frequency of a circuit has been rising, and also a frequency component included in a power supply current has been increasing. The number of faults, which are not conventionally problematic and caused by power supply noise, has been growing due to such a situation.

Power supply noise is evaluated by creating a power supply noise analysis model of a circuit board, which copes with such faults, and by using a circuit simulator with the power supply noise analysis model.

Conventionally, a power supply noise analysis model is created by extracting as a power supply pair a portion where power supply islands existing in different power supply layers of a circuit board, by arranging nodes in units of power supply pairs, and by calculating impedance between nodes.

FIGS. 1A and 1B show a conventional power supply noise analysis model. A portion where power supply islands existing in different power supply layers overlap is extracted as a power supply pair. FIG. 1A shows a case where power supply pairs 1 and 2 are extracted from a first layer. 4 nodes represented with white circles shown in FIG. 1A are arranged in the power supply pair 1, and also 4 nodes represented with white circles are arranged in the power supply pair 2.

FIG. 1B shows mesh regions that respectively enclose the nodes. A predetermined region centering each of the nodes is set as a mesh region.

If the power supply pairs extracted as described above are individually put into models, power supply pairs existing in the same power supply island are generated as separate models. Therefore, the power supply pairs 1 and 2 are merged into one model by setting boundary line nodes in a boundary line between these pairs as shown in FIG. 1A.

However, since the number of power supply pairs to be partitioned increases in a power supply island of a complicated shape, also the number of boundary line nodes grows. As a result, the ratio of the number of boundary line nodes, which occupies the total number of nodes, becomes high. As the number of boundary line nodes increases, so does the number of elements such as an inductor, a resistor, a capacitor, etc. of a power supply noise analysis model. This leads to an increase in the size of the power supply noise analysis model. Additionally, as the size of a power supply noise analysis model increases, analysis time at the time of simulation becomes longer.

Furthermore, a via is used to connect layers on a multi-layer circuit board. For example, if the angles of a via in an upper layer and a via in a lower layer do not align, misaligned portions become overlapping portions of a power supply island of another layer, and the overlapping portions are extracted as power supply pairs. Therefore, a plurality of minute power supply pairs is extracted for one via. If these pairs are respectively put into models, the number of power supply noise analysis models increases.

Still further, if an overlapping portion of power supply islands having shapes shown in FIG. 3 are extracted, for example, if the overlapping portion of graphics A and B is extracted, an intersection point T of the graphics A and B sometimes becomes an intersection point T' due to an error of a graphic computation. If an overlapping portion of the graphics A and C including this intersection point T' is extracted as a power supply pair, a shaded region and a black region in FIG. 3 are extracted as separate overlapping regions, and the black region in FIG. 3 is extracted as a power supply pair. A minute power supply pair which does not originally exist is extracted due to an error of a graphic computation as described above, leading to an increase in the number of power supply noise analysis models.

FIGS. 4A and 4B explain a conventional method for calculating the inductance of a lead pattern. FIG. 4A is a perspective view of a circuit board, whereas FIG. 4B is its cross-sectional view.

If the lead pattern of a power supply island in an L1 layer, and a power supply island in an L9 layer configure a power supply pair, the inductance of the lead pattern in the L1 layer is conventionally calculated from the area of the lead pattern in the L1 layer, the area of the power supply island in the L9 layer, and a distance between the L1 and the L9 layers. However, if a power supply island exists in another layer in the neighborhood of the lead pattern as shown in FIG. 4A, the inductance calculated as described above differs from an actual value in many cases.

Patent Document 1 recites the creation of a semiconductor device model for a power supply noise analysis by creating each model of power supply wiring, an internal capacitance, an internal consumption current, and an input/output cell of a semiconductor device, and by merging the models.

Patent Document 2 recites a ripple process executed when the arrangement of nodes of a power supply noise analysis model is determined.

[Patent Document 1] Japanese Published Unexamined Patent Application No. 2004-234618

[Patent Document 2] Japanese Published Unexamined Patent Application No. 2004-334654

SUMMARY OF THE INVENTION

An object of the present invention is to simplify a power supply noise analysis model by reducing the number of nodes of the power supply noise analysis model of a circuit board.

A power supply noise analysis model generating method according to the present invention comprises a step of detecting an overlap of two power supply islands existing in different layers of a circuit board, and of extracting overlapping power supply islands as a power supply pair, a step of arranging a node in the power supply pair based on CAD data of the circuit board, a step of determining whether nor not the coordinates of the node arranged in the power supply pair exist in the power supply island that configures the power supply pair, and of setting the node in the power supply island if the coordinates of the node exist in the power supply island, a step of calculating impedance between nodes, and a step of generating a power supply noise analysis model in units of power supply islands based on the calculated impedance between nodes.

The present invention eliminates the need for providing a boundary line node for connecting a plurality of power supply pairs that belong to one power supply island, whereby the number elements such an inductor, a capacitor, etc., which configure the power supply noise analysis model, can be reduced. As a result, a processing time for generating the power supply noise analysis model can be shortened. Also the processing time of simulation using the power supply noise analysis model can be shortened.

In the power supply noise analysis model generating method according to the present invention, the step of extracting a power supply pair comprises a step of calculating a capacitance value from an area of the power supply pair, and of excluding a power supply pair, the calculated capacitance value of which is equal to or smaller than a certain value, from a creation target of a power supply noise analysis model.

With this configuration, a power supply pair the capacitance value of which is equal to or smaller than a certain value can be excluded from a creation target of a power supply noise analysis model, whereby the processing time for creating the power supply noise analysis model can be shortened.

In the power supply noise analysis model generating method according to the present invention, the step of calculating the impedance between nodes comprises a step of determining whether or not a power supply island exists in another layer within a certain distance from a link connecting nodes, and of calculating the inductance between nodes based on a distance from a layer where the link exists to a layer where the power supply island exists if the power supply island exists within the certain distance.

With this configuration, inductance between nodes can be calculated in consideration of the influence of a power supply island which exists in another layer in the neighborhood of a link connecting nodes, whereby the inductance can be calculated more accurately.

In the power supply noise analysis model generating method according to the present invention, the step of calculating the impedance between nodes comprises a step of calculating a midpoint of the link connecting nodes, a step of detecting a power supply island existing in a certain search range with reference to the midpoint, and a step of calculating the inductance between nodes based on the distance from the layer where the link exists to the layer where the power supply island exists if the power supply island is detected.

With this configuration, the power supply island existing in a neighboring layer can be detected with reference to the midpoint of the link. As a result, inductance can be calculated in consideration of the influence of the power supply island in the neighboring layer.

A power supply noise analysis model generating apparatus according to the present invention comprises a power supply pair extracting unit detecting an overlap of two power supply islands existing in different layers of a circuit board, and extracting overlapping power supply islands as a power supply pair, a node arranging/projecting unit arranging a node in the power supply pair based on CAD data of the circuit board, determining whether nor not the coordinates of the node arranged in the power supply pair exist in the power supply island, and for setting the node in the power supply island if the coordinates of the node exist in the power supply island, an impedance calculating unit calculating impedance between nodes set by the node arranging/projecting unit, and a model creating unit creating a power supply noise analysis model in units of power supply islands based on the calculated impedance between nodes.

The present invention eliminates the need for providing a boundary line node for connecting a plurality of power supply pairs belonging to one power supply island, whereby the number of elements such as an inductor, a capacitor, etc., which configure the power supply noise analysis model, can be reduced. As a result, a processing time for generating the power supply noise analysis model can be shortened. Also the processing time of simulation using the power supply noise analysis model can be shortened.

BRIEF DESCRIPTION OF THE DRAWINGS

FIG. 5 shows a design flow of a printed circuit board, according to a preferred embodiment;

FIG. 6 shows a configuration of a power supply noise analysis model generating apparatus according to the preferred embodiment;

FIGS. 10A and 10B show power supply islands and power supply pairs;

FIG. 12 shows nodes projected on power supply islands;

FIG. 13 is a flowchart showing a process for calculating impedance between nodes;

FIG. 14 explains a method for calculating resistance and inductance between nodes;

FIG. 15 shows the impedances of power supply/GND layers;

FIG. 19 explains a method for searching a power supply island near to a link.

DESCRIPTION OF THE PREFERRED EMBODIMENTS

Figure 1:
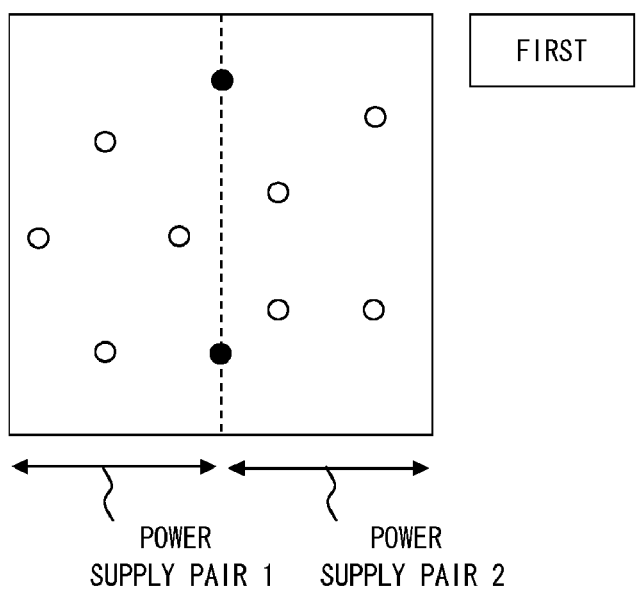
FIGS. 1A and 1B show a conventional power supply noise analysis model.
Figure 1:
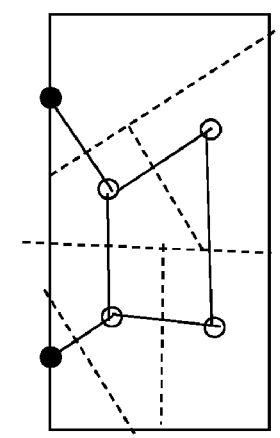
Figure 2:
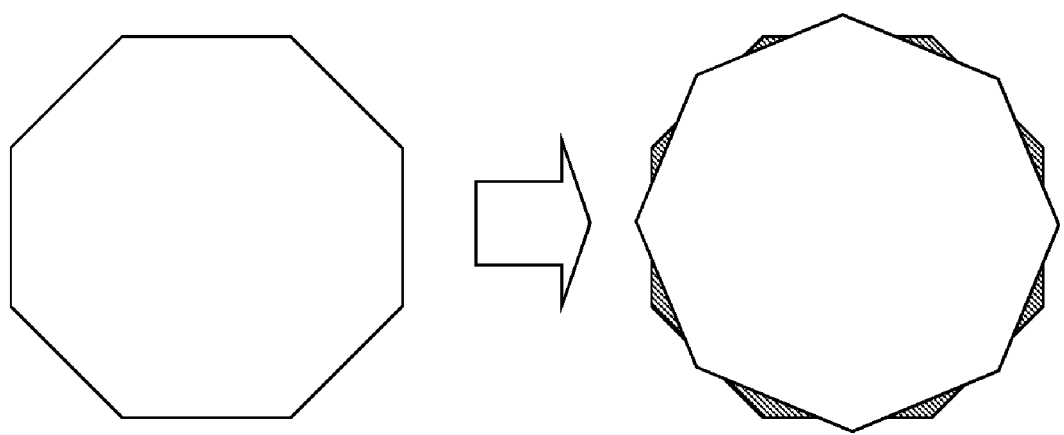
FIG. 2 shows minute power supply pairs caused by the misalignment of angles of vias.
Figure 3:
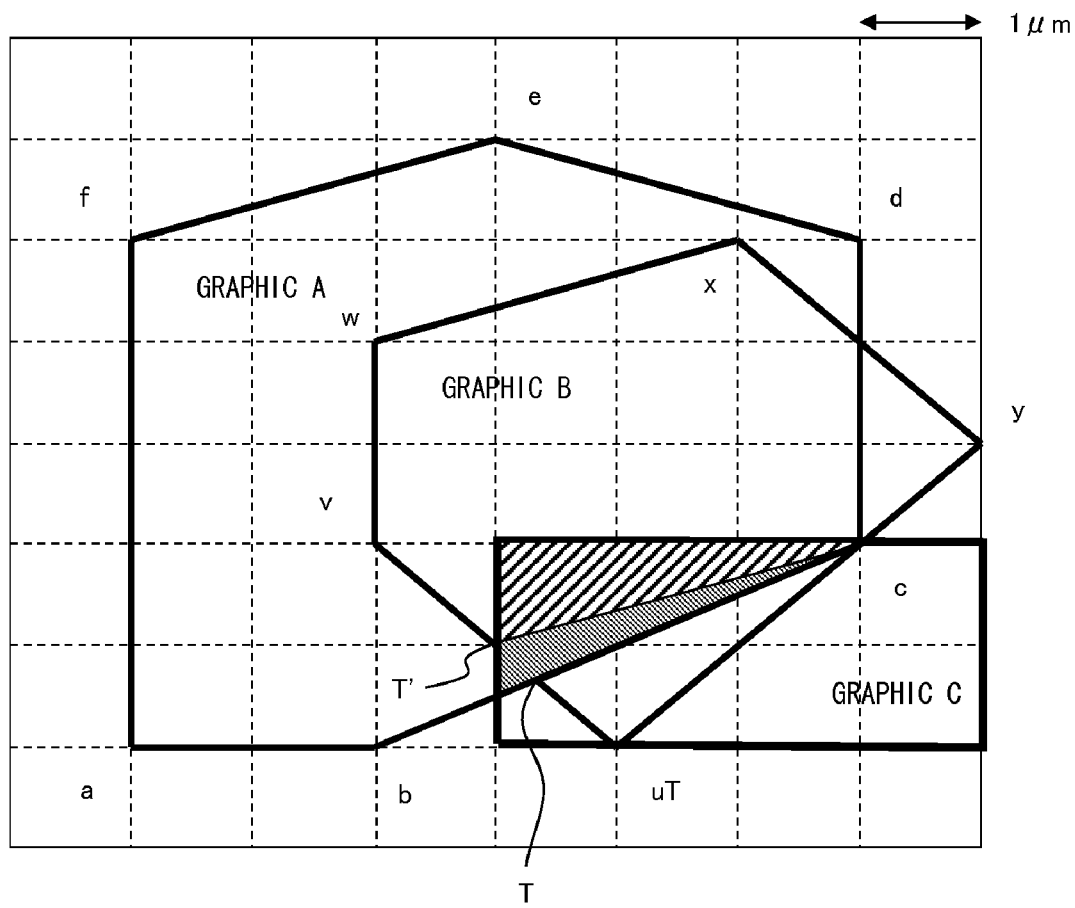
FIG. 3 shows a minute power supply pair caused by an error of a graphic computation.
Figures 4A, 4B:
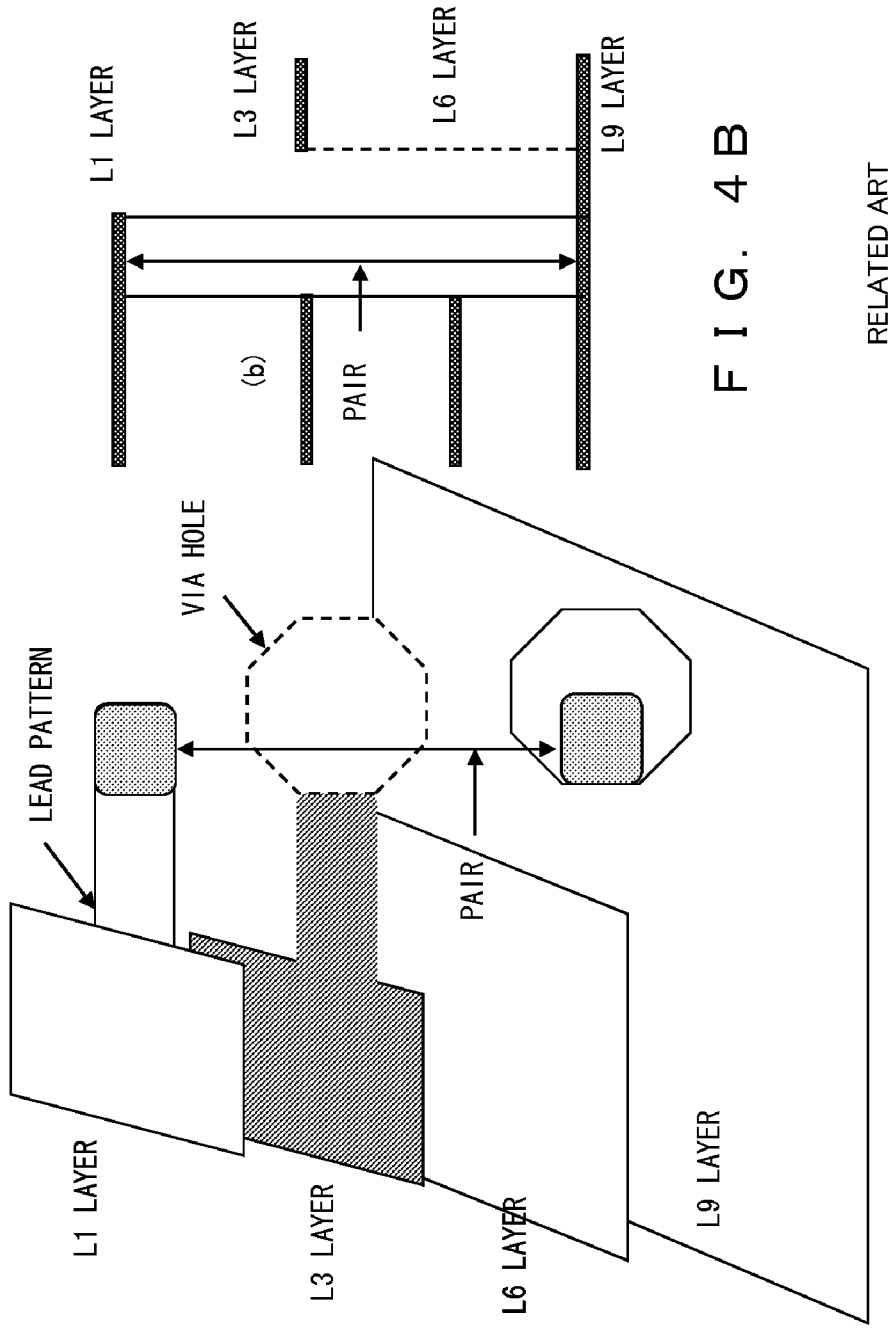
FIGS. 4A and 4B explain a conventional method for calculating the inductance of a lead pattern.

A preferred embodiment according to the present invention is described below with reference to the drawings. FIG. 5 shows a design flow when a printed circuit board is designed by using a CAD apparatus.

When a user makes the conceptual design of a printed circuit board by using a CAD (Computer Aided Design) apparatus (S11 of FIG. 5), CAD data 11, which is design data in a conceptual phase, is stored in a storage device such as a hard disk, etc.

A power supply noise analysis model generating apparatus generates a power supply noise analysis model based on the CAD data 11 (S12). Next, a circuit simulator analyzes the noise level of the printed circuit board by using the power supply noise analysis model (S13), and displays the results of the analysis (S14). Then, it is determined whether or not the results of the analysis satisfy a predetermined condition (S15). If the results do not satisfy the predetermined condition, the conceptual design is modified.

If the results of the evaluation (analysis) satisfy the condition, the flow proceeds to a circuit design phase of step S16. Upon completion of a circuit design, a board design is made in detail based on the circuit design (S17). Next, a power supply noise analysis model is generated by obtaining the CAD data 11 of the printed circuit board (S12). The same processes as those in the above described steps S13 to S15 are executed. If the results of the evaluation of step S15 are OK, the flow proceeds to a manufacturing/test phase.

FIG. 6 shows a configuration of a power supply noise analysis model generating apparatus 21 according to the preferred embodiment of the present invention. The power supply noise analysis model generating apparatus 21 comprises a power supply pair extracting unit 22, a node arranging/projecting unit 23, a mesh generating unit 24, an impedance calculating unit 25, and a model generating unit 26.

Functions of the units of the power supply noise analysis model generating apparatus 21 are described below with reference to the flowchart of a power supply noise analysis model generation process shown in FIG. 7.

The power supply pair extracting unit 22 obtains the CAD data of a circuit board from a CAD apparatus (S21 of FIG. 7), and extracts overlapping power supply islands among power supply islands existing in different layers of the circuit board as a power supply pair (S22).

The node arranging/projecting unit 23 arranges a node in the extracted power supply pair, and projects the node of the power supply pair on the power supply islands to which the power supply pair belongs (S23).

The mesh generating unit 24 determines a mesh region that encloses a node for each power supply island, and the impedance calculating unit 25 calculates impedance (L, R, C) between nodes (S24).

The model generating unit 26 creates a power supply noise analysis model based on the impedance between nodes of each layer, and a capacitance between layers (S25).

Figure 7:
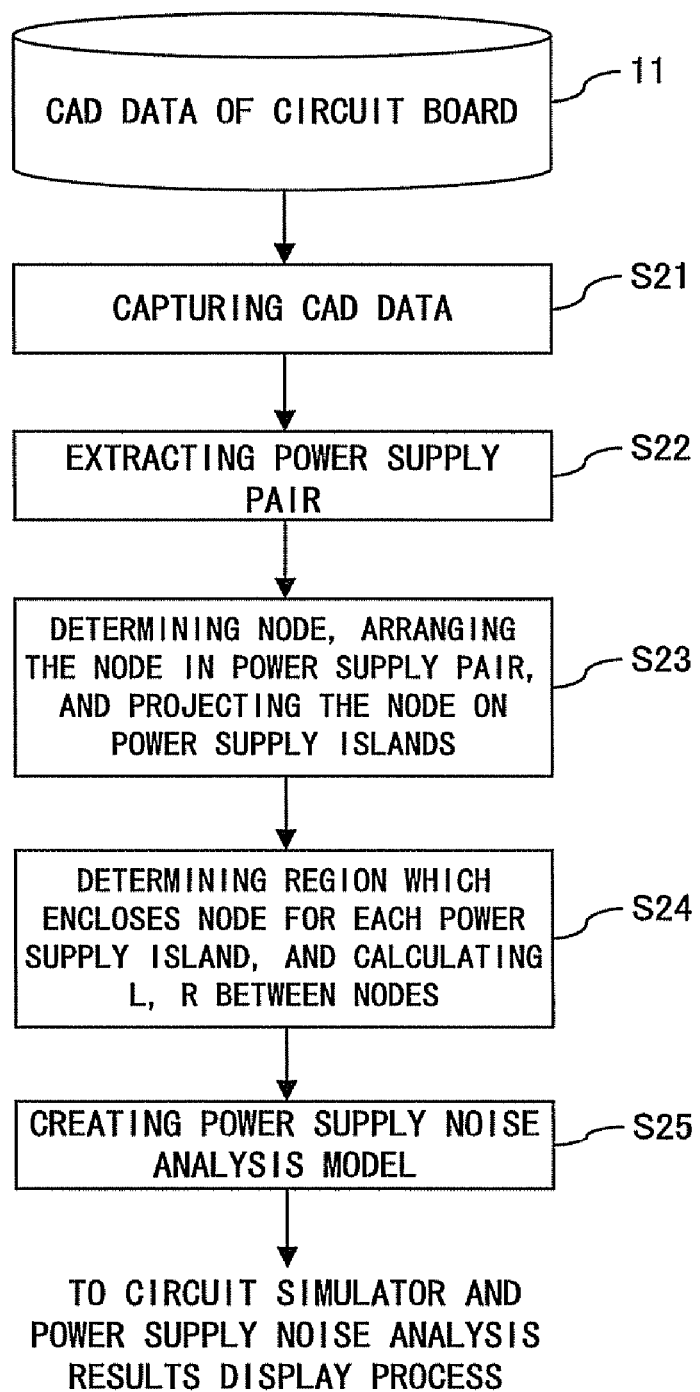
FIG. 7 is a flowchart showing a power supply noise analysis model generation process.
Figure 8:
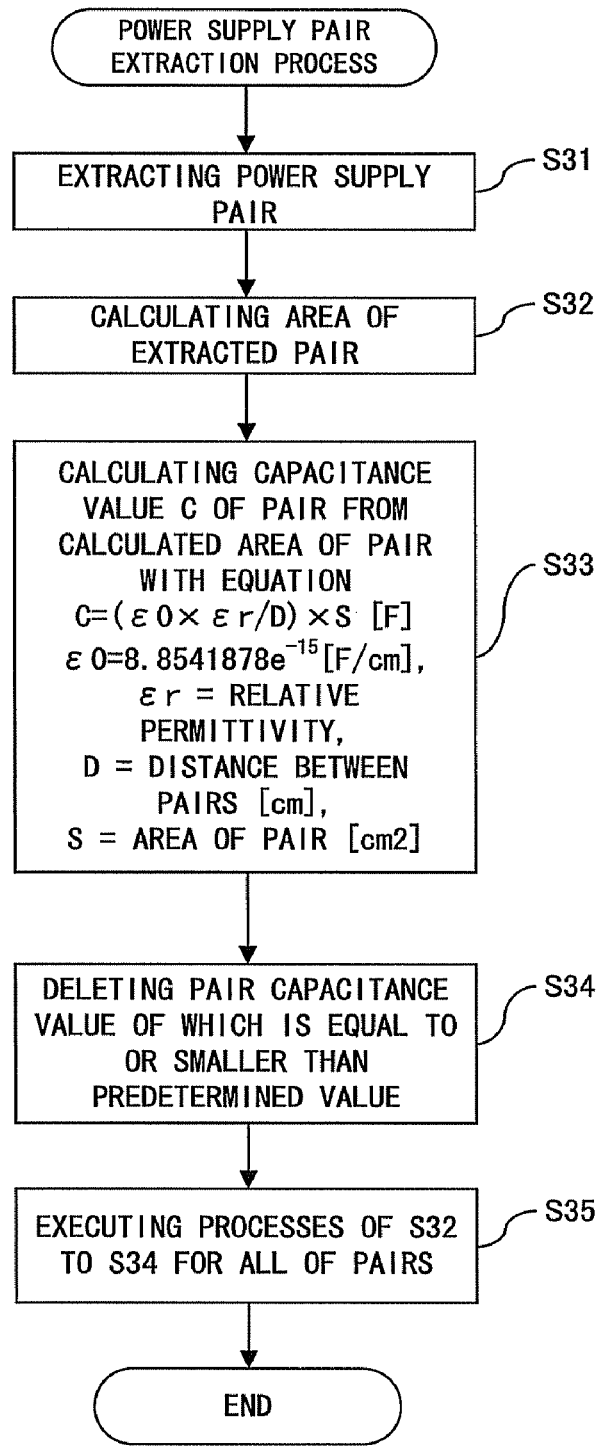
FIG. 8 is a flowchart showing a power supply pair extraction process.

FIG. 8 is a flowchart showing the power supply pair extraction process of step S22 shown in FIG. 7.

Overlapping power supply islands among power supply islands existing in different layers of the circuit board are extracted as a power supply pair (S31 of FIG. 8). Next, the area of the overlapping portion of the extracted power supply pair is calculated (S32).

A capacitance value C of the power supply pair is calculated by substituting the area of the power supply pair for an equation $C=(\epsilon 0 \times \epsilon r/D) \cdot S$ (S33). Note that $\epsilon 0=8.8541878e{-}^{15}$ [F/cm], $\epsilon r$ is relative permittivity, D[cm] is a distance between power supply pairs, and S[cm$^2$] is the area of a power supply pair.

Next, a power supply pair the capacitance value C of which is equal to or smaller than a predetermined value is deleted (S34). The processes of steps S32 to S34 are executed for all of extracted power supply pairs (S35).

With the above described power supply pair extraction process, a minute power supply pair the capacitance value of which is equal to or smaller than the predetermined is deleted, whereby the number of power supply pairs for which a power supply noise analysis model is to be created can be reduced.

Note that the deletion of a power supply pair is not limited to the method for determining whether or not a capacitance value is equal to or smaller than a predetermined value. For example, a power supply pair the area of which is equal to or smaller than a predetermined value may be deleted.

Figure 9:
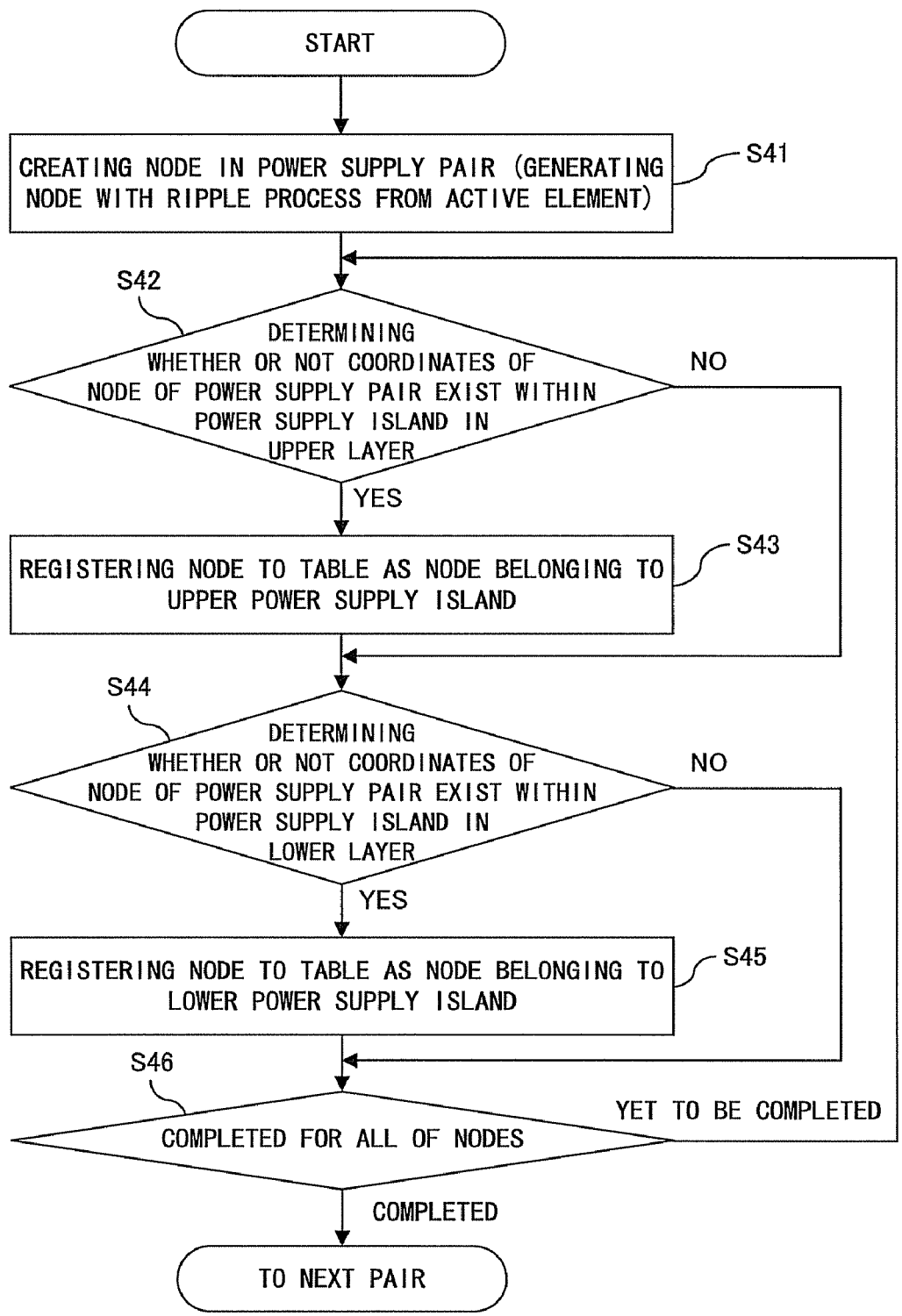
FIG. 9 is a flowchart showing a node arrangement/projection process.

FIG. 9 is a flowchart showing the node arrangement/projection process of step S23 shown in FIG. 7.

Initially, nodes are arranged in the positions of a pin and a via of an element existing in a power supply pair. The nodes are arranged with a ripple process in consideration of the influences of electromagnetic waves emitted from active elements (S41 of FIG. 9).

The ripple process is a process for calculating the ripples of electromagnetic waves emitted from a plurality of active elements existing in a power supply pair, and for determining the arrangement of nodes by synthesizing the ripples. Here, assume that the outside shape of an active element is the ripple of a ripple level 0, and a ripple extended outward by n times is the ripple of a ripple level n. Also assume that an interval from the ripple of the ripple level 0 to the ripple of the ripple level 1 is the ripple pitch of the ripple level 0, and an interval from the ripple of the ripple level n to the ripple of a ripple level n+1 is the ripple pitch of the ripple level n.

A minimum ripple pitch Pmin can be calculated from the maximum operating frequency of an active element, the relative permittivity $\epsilon r$ and the constant of an insulator of the board. Additionally, a ripple pitch Pminn_a(n) of the ripple level n of an active element a can be obtained from the ripple pitch Pmin_a(n−1) of a ripple level n−1, the area S(n) of a region inside the ripple level n, the area S (n−1) of a region inside the ripple level n−1, and a correction factor Kd. Then, nodes are arranged at intervals of the ripple pitch Pminn_a(n) of a corresponding ripple level in a region between ripples. This ripple process is recited in Japanese Published Unexamined Patent Application No. 2004-334654.

Next, it is determined whether or not the coordinates of a node arranged in the power supply pair exist in a power supply island in an upper layer (S42). If the coordinates of the node of the power supply pair exist in the power supply island in the upper layer ("YES" in S42), the flow proceeds to step S43, in which the node of the power supply pair is registered to a table as a node belonging to the power supply island in the upper layer. This table is stored in a memory, etc. of the power supply noise analysis model generating apparatus 21.

With the above described process, the node arranged in the power supply pair is set (projected) in the power supply island in the upper layer, which configures the power supply pair.

If the result of the determination made in step S42 is "NO", or subsequent to step S43, it is determined in step S44 whether or not the coordinates of the node arranged in the power supply pair exist in a power supply island in a lower layer. If the coordinates of the node of the power supply pair exist in the power supply island in the lower layer ("YES" in S44), the flow proceeds to step S45, in which the node of the power supply pair is registered to a table as a node belonging to the power supply island in the lower layer. With the above described process, the node arranged in the power supply pair is set in the power supply island in the lower layer, which configures the power supply pair.

Subsequent to step S44 or S45, the flow proceeds to step S46, in which it is determined whether or not the above described process is completed for all of nodes of the power supply pair. If a node yet to be completed is left, the flow returns to step S42, from which the above described process is repeated.

Here, nodes arranged in power supply pairs and power supply islands with the above described node arrangement/ projection process are described with reference to FIGS. 10 to 12.

FIG. 10A shows power supply islands in three layers when a circuit board is composed of the three layers. Almost the whole of the region of the board is the region of a power supply island 31 in a first layer, a region in the right half portion of the region of the board is the region of a power supply island 32 in a second layer, and almost the whole of the region of the board is the region of a power supply island 33 in a third layer. Broken lines at the center of the first and the third layers represent that regions on the left sides of the broken lines are an overlapping portion which configures the power supply pair of the first and the third layers.

Upon detection of the overlap of these power supply islands, the regions in the left half portions of the power supply island 31 in the first layer and the power supply island 33 in the third layer are extracted as a power supply pair 1 as shown FIG. 10B. Additionally, a region in the right half portion of the power supply island 31 in the first layer, and the region of the power supply island 32 in the second layer are extracted as a power supply pair 2. Furthermore, the regions in the right half portions of the power supply island 32 in the second layer, and the power supply island 33 in the third layer are extracted as a power supply pair 3.

Figure 11A:
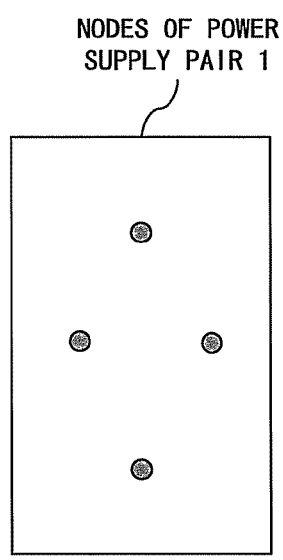
FIGS. 11A to 11C show the arrangement of nodes of power supply pairs.
Figure 11B:
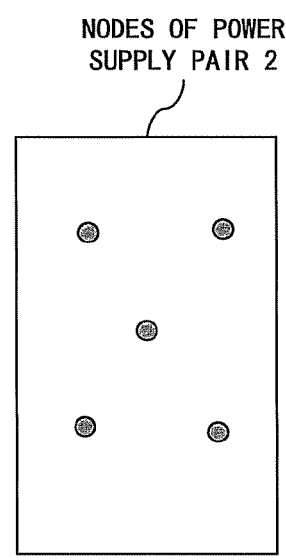
Figure 11C:
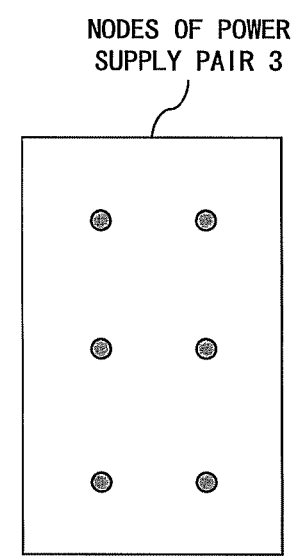

Here, assume that 4 nodes are arranged in the power supply pair 1, 5 nodes are arranged in the power supply pair 2, and 6 nodes are arranged in the power supply pair 3 with the process of step S41 in FIG. 9 as shown in FIGS. 11A to 11C.

Initially, it is determined whether or not the coordinates of the nodes of the power supply pair 1 exist within the region of the power supply island 31 in the first layer, which is the upper layer of the power supply pair 1. If the coordinates of the nodes exist in the power supply island 31 of the first layer, these nodes are registered to a table (not shown) for storing nodes of the power supply island 31.

Similarly, it is determined whether or not the coordinates of the nodes of the power supply pair 1 exist within the power supply island 33 in the third layer, which is the lower layer of the power supply pair 1. If the corresponding coordinates of the nodes exist in the power supply island 33, these nodes are registered to a table of the power supply island 33.

Next, it is determined whether or not the coordinates of the nodes of the power supply pair 2 exist within the region of the power supply island 31 in the first layer, which is the upper layer of the power supply pair 2. If the corresponding coordinates of the nodes exist in the power supply island 31 in the first layer, these nodes are registered to the table of the power supply island 31.

Similarly, it is determined whether or not the coordinates of the nodes of the power supply pair 2 exist within the region of the power supply island 32 in the second layer, which is the lower layer of the power supply pair 2. If the corresponding coordinates of the nodes exist in the power supply island 32 in the second layer, these nodes are registered to a table of the power supply island 32.

Next, it is determined whether or not the coordinates of the nodes of the power supply pair 3 exist within the region of the power supply island 32 in the second layer, which is the upper layer of the power supply pair 3. If the corresponding coordinates of the nodes exist in the power supply island 32 in the second layer, these nodes are registered to the table of the power supply island 32.

Similarly, it is determined whether or not the coordinates of the nodes of the power supply pair 3 exist within the region of the power supply island 33 in the third layer, which is the lower layer of the power supply pair 3. If the corresponding coordinates of the nodes exist in the power supply island 33 in the third layer, these nodes are registered to the table of the power supply island 33.

FIG. 12 shows the nodes projected on the power supply islands. Since the power supply pairs 1 and 2 are extracted from the power supply island 31 in the first layer, the 4 nodes of the power supply pair 1, and the 5 nodes of the power supply pair 2 are set in the power supply island 31.

Because the power supply pairs 2 and 3 are extracted from the power supply island 32 in the second layer, the 5 nodes of the power supply pair 2, and the 6 nodes of the power supply pair 3 are set in the power supply island 32.

Since the power supply pairs 1 and 3 are extracted from the power supply island 33 in the third layer, the 4 nodes of the power supply pair 1, and the 6 nodes of the power supply pair 3 are set in the power supply island 33.

With the above described node arrangement/projection process, the nodes of the power supply pairs belonging to each of the power supply islands are set in each power supply island, whereby the nodes of a plurality of power supply pairs can be arranged in one power supply island. As a result, a power supply noise analysis model can be created in units of power supply islands when a power supply noise analysis model is created from a plurality of power supply pairs belonging to the same power supply island. This eliminates the need for providing a boundary line node in order to connect the nodes of the plurality of power supply pairs. As a result, the number of nodes of a power supply noise analysis model is reduced, whereby the number of elements such as an inductor, a resistor, a capacitor, etc., which represent impedance between nodes, can be decreased. The number of elements of a power supply noise analysis model is reduced in this way, whereby the creation time of a power supply noise analysis model, and the processing time of simulation using the power supply noise analysis model can be shortened.

The process for calculating impedance between nodes, which is executed in step S24 of FIG. 7, is described next with reference to the flowchart of FIG. 13.

A distance d between 2 nodes of a power supply island is obtained (S51 of FIG. 13). Next, a length W of contact side of meshes to which the nodes belong is obtained (S52). For example, a bisector of a straight line which connects an arbitrary node and its neighboring node is drawn, a region enclosed by a plurality of bisectors is assumed to be a mesh region enclosing the arbitrary node, and the length of the contact side of a contiguous mesh region is assumed to be W.

Next, a resistance value R between nodes is calculated with an expression "☐R×d/W" by assuming a resistance value per unit area to be ☐R (S53).

FIG. 14 explains a method for calculating resistance and inductance between nodes. Assume that a distance between nodes A and B is d, and the length of a contact side of a mesh region enclosing the node A and that enclosing the node B is W as shown in FIG. 14. In this case, the resistance value between the nodes A and B is proportional to the distance d between the nodes, and inversely proportional to the length W of the contact side. Accordingly, the resistance value R between the nodes can be obtained from the resistance value per unit area ☐R, the distance d between nodes, and the length W of the contact side. Also the inductance can be calculated in a similar manner.

Next, the inductance between nodes is calculated with an expression "☐L×d/W" by assuming the inductance per unit area to be ☐L (S54).

The capacitance value of a node of the power supply pair can be obtained, for example, from the area of a mesh region enclosing a node in an upper layer, the area of a corresponding mesh region in a lower layer, and a distance between the layers, although this is not shown in FIG. 13.

The above described process is executed for all of nodes of power supply islands of each layer, whereby all of impedances between nodes can be calculated.

FIG. 15 shows the impedances of power supply/GND layers, which are calculated with the above described impedance calculation process.

The inductance, the resistance value, and the capacitance value of a link which connects a plurality of nodes 41a, 41b, ..., 41n in the upper power supply/GND layer are calculated. Similarly, the inductance, the resistance value, and the capacitance value of a link which connects a plurality of nodes 42a, 42b, ..., 42n in the lower power supply/GND layer are calculated. A power supply noise analysis model can be created based on the impedances of the power supply/GND layers.

A process for calculating the inductance of a link which connects the nodes of a power supply island in an arbitrary layer based on a distance to another layer which configures a power supply pair, or a distance to a power supply island in another layer in the middle of the power supply pair is described with reference to the flowcharts of FIGS. 16 and 17.

Initially, an example of the structure of a circuit board when a link which connects nodes in an upper layer, and a power supply island in a lower layer configure a power supply pair, and intermediate layers exist in the middle of the power supply pair is described with reference to FIG. 18.

Figure 18:
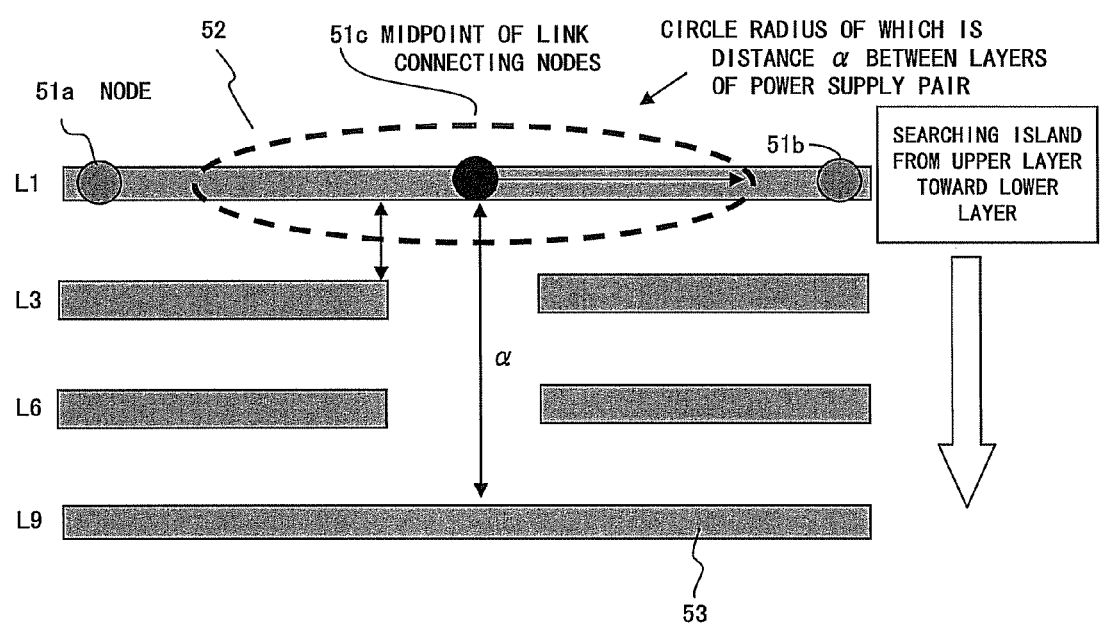
FIG. 18 explains a method for searching a power supply island near to a link.

On the circuit board shown in FIG. 18, a link (power supply pattern) 52 which connects nodes 51a and 51b of a power supply island in the uppermost L1 layer, and a power supply island 53 in the lowermost L9 layer configure a power supply pair, and L3 and L6 layers, which have a power supply island, exist between the L1 and the L9 layers. The distance between the L1 and the L9 layers is α.

Figure 16:
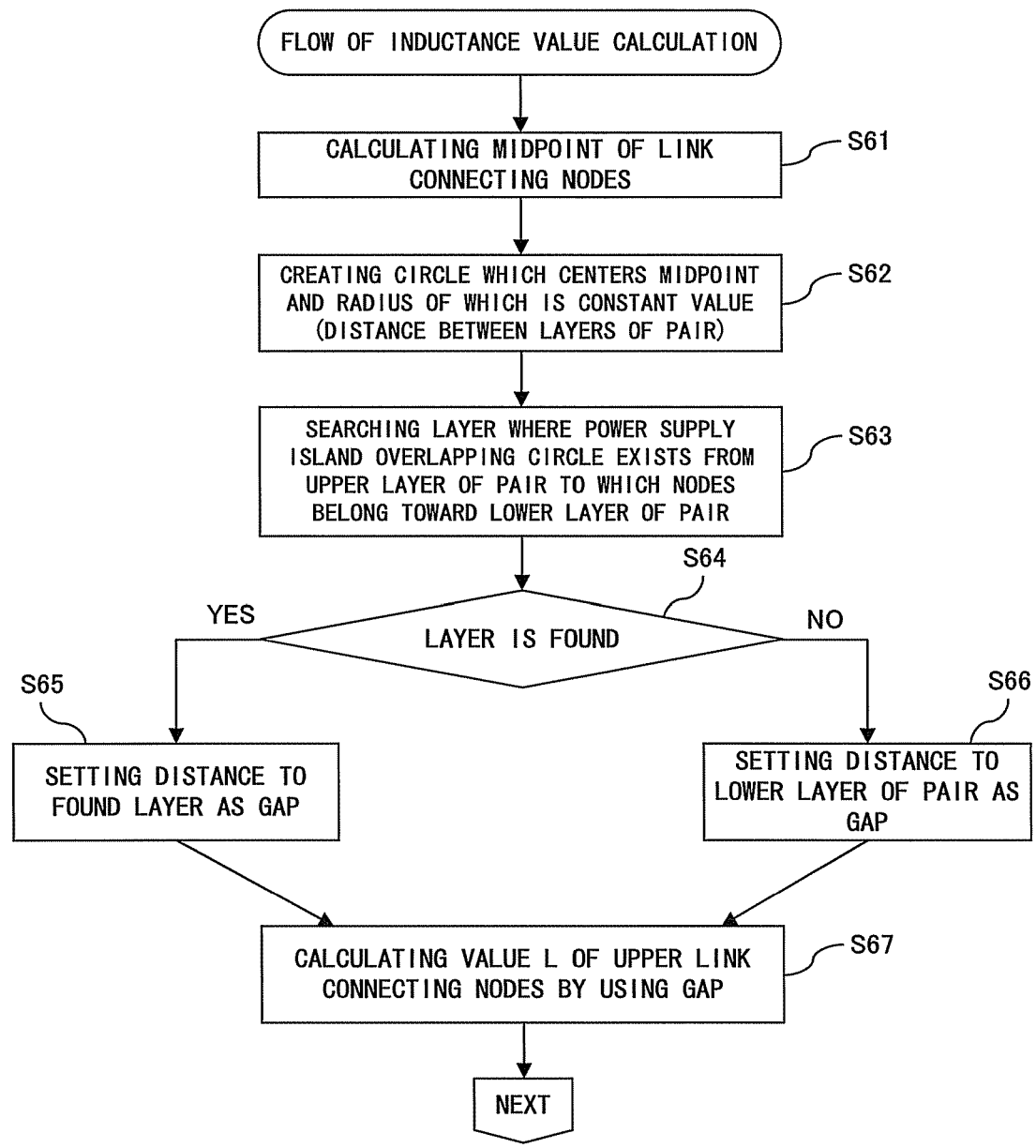
FIG. 16 is a flowchart (No. 1) showing an inductance calculation process.

The process of FIG. 16 is described next. Initially, the midpoint of a link which connects nodes is calculated (S61 of FIG. 16). With this process, for example, the midpoint 51c of the link 52 which connects the nodes 51a and 51b shown in FIG. 18 is calculated.

Next, a circle the radius of which is a constant value is created by centering the midpoint (S62). With this process, for example, a circle the radius of which is the distance α between the L1 and the L9 layers that configure the power supply pair is created.

Next, a layer where a power supply island overlapping the circle, which centers the midpoint and has a predetermined radius, exists is searched from the upper layer of the power supply pair, to which the nodes belong, toward the lower layer (S63).

Then, it is Determined Whether or not the Layer where the power supply island overlapping the circle exists is detected (S64). If the layer where the power supply island overlapping the circle exists is detected ("YES" in S64), the flow proceeds to step S65, in which the distance from the layer where the link exists to the layer where the power supply island is detected is set as GAP.

Or, if the layer where the power supply island exists is not detected ("NO" in S64), the flow proceeds to step S66, in which the distance from the layer where the link exists to the lower layer of the power supply pair is set as GAP.

Next, inductance between the nodes in the upper layer of the power supply pair is calculated with GAP (S67).

With the above described process, inductance between nodes is calculated based on a distance to an intermediate layer if a power supply island overlapping a circle, which centers the midpoint of a link and has a predetermined radius, exists in the intermediate layer separately from the layers of a power supply pair. The inductance is calculated by using a distance to a power supply island, which is shorter than a distance to a power supply island of a layer which configures a power supply pair as described above, whereby the inductance can be obtained in consideration of influences of power supply islands in intermediate layers.

Figure 17:
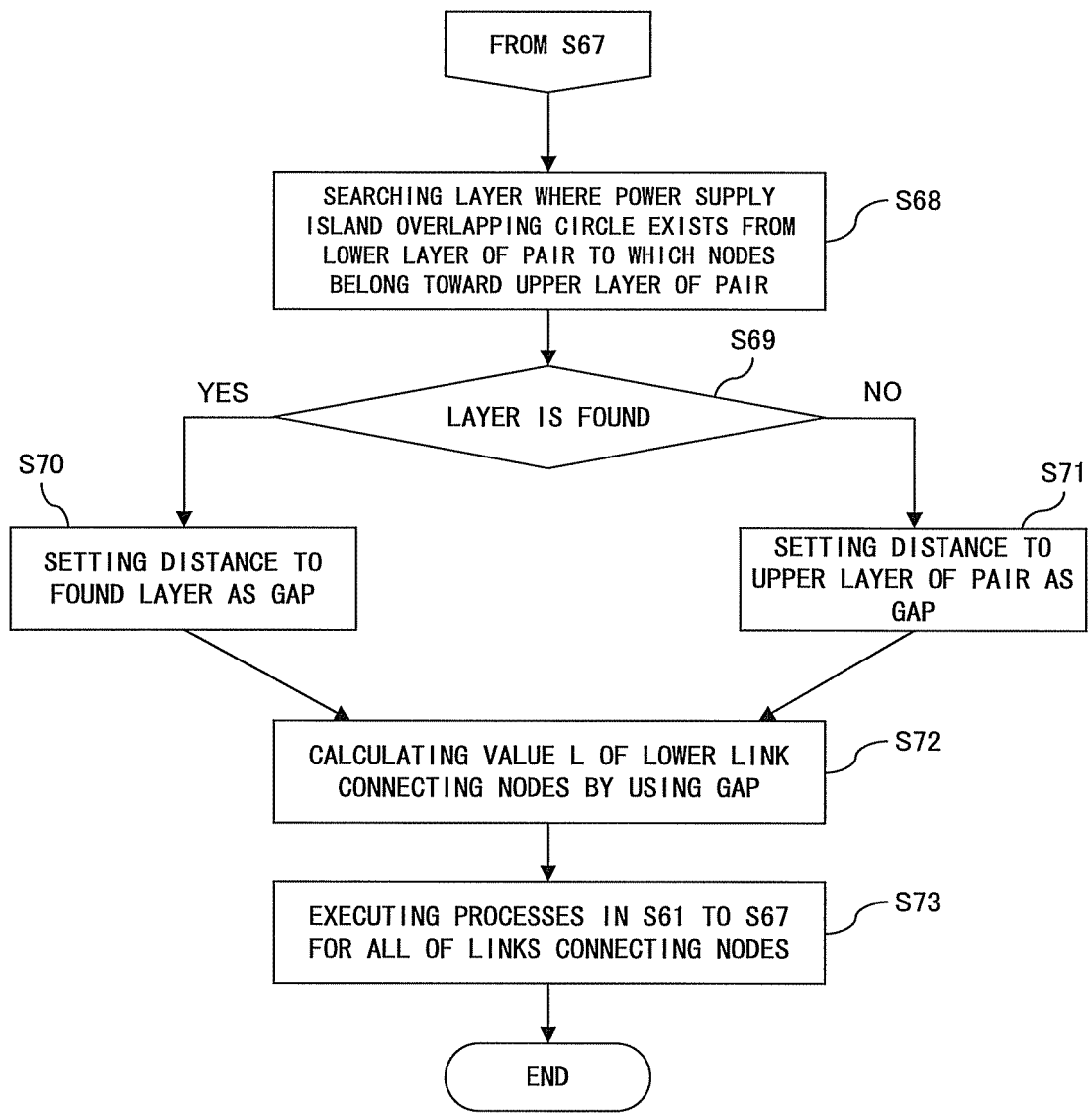
FIG. 17 is a flowchart (No. 2) showing the inductance calculation process.

Next, in step S68 of FIG. 17, a layer where a power supply island overlapping the circle of the predetermined radius exists is searched from the lower layer of the power supply pair to which the nodes belong toward the upper layer of the power supply pair.

Then, it is determined whether or not the layer where the power supply island overlapping the circle of the predetermined radius exists is detected (S69). If the layer where the power supply island overlapping the circle of the predetermined radius exists is detected ("YES" in S69), the flow proceeds to step S70, in which the distance from the layer where the link exists to the layer where the power supply island is detected is set as GAP.

Or, if the layer where the power supply island overlapping the circle exists is not detected ("NO" in S69), the flow proceeds to step S71, in which the distance from the layer where the link exists to the upper layer of the power supply pair is set as GAP.

Next, the inductance of the link in the lower layer of the power supply pair is calculated with GAP (S72).

FIG. 19 explains the method for searching a power supply island existing in a layer near to a link. FIG. 19 exemplifies a case where the link of a power supply island in an L1 layer and the link of an L9 layer configure a power supply pair, and intermediate layers exist in between.

In this case, a layer where a power supply island overlapping a circle which centers a midpoint 51c of the link and has a predetermined radius (such as a distance between the layers of the power supply pair) exists is searched from the upper L1 layer of the power supply pair toward the lower layer. If the layer where the power supply island exists is detected, the inductance of the link of the L1 layer is calculated by using the distance from the L1 layer to the detected layer.

Similarly, a layer where a power supply island overlapping a circle which centers a midpoint 51c' of the link and has a predetermined radius exists is searched from the lower L9 layer of the power supply pair toward the upper layer. If the layer where the power supply island exists is detected, the inductance of the link of the L9 layer is calculated by using the distance from the L9 layer to the detected layer.

With the above described process for calculating inductance between nodes, inductance between nodes is calculated by using a distance between a layer where a link exists and a layer where a power supply island exists, if the power supply island exists in another layer within a predetermined distance from the link in the layer, whereby the inductance can be obtained in consideration of the influence of the power supply island existing in the neighborhood. As a result, the inductance between nodes can be obtained more accurately.

According to the above described preferred embodiment, a power supply noise analysis model can be created in units of power supply islands having a plurality of power supply pairs. This eliminates the need for providing a boundary line node for connecting power supply pairs as conventional. Accordingly, the number of nodes of a power supply noise analysis model can be reduced, whereby the number of elements such as an inductor, a resistor, a capacitor, etc. can be decreased. A processing time for creating a model can be shortened by reducing the number of elements of the power supply noise analysis model as described above. Also the processing time of simulation using the power supply noise analysis model can be shortened.

Additionally, the time of the process for creating a power supply noise analysis model can be shortened by deleting a minute power supply pair.

Furthermore, inductance between nodes can be obtained more accurately by calculating the inductance with the use of a distance to a layer if a power supply island exists in the layer in the neighborhood of a link connecting the nodes when the inductance between nodes of the power supply island is calculated. This is effective at calculating the inductance of a lead pattern, etc. of a power supply line of a power supply island.

The above described preferred embodiment eliminates the need for providing a boundary line node for connecting a plurality of power supply pairs that belong to the same power supply island, whereby the number of elements such as an inductor, a resistor, a capacitor, etc. of a power supply noise analysis model can be reduced. As a result, the time of the process for generating a power supply noise analysis model can be shortened.

The present invention is not limited to the above described preferred embodiment, and may be configured, for example, as follows.

(1) A creation target of a power supply noise analysis model is not limited to a printed circuit board, and may be a circuit board of a semiconductor integrated device.

(2) The method for determining the arrangement of nodes is not limited to the method for determining the positions of nodes with the ripple process. The arrangement of nodes may be determined with another known method.

(3) The calculation of inductance between nodes is not limited to the lead pattern of a power supply island. Also the calculation of inductance between nodes in a central portion of a board may be applicable.

What is claimed is:

1. A circuit board power supply noise analysis model generating method executed by a computer, the method comprising:
   extracting, by a computer, power supply pairs, each of the power supply pairs including an overlapping part of power supply islands in different layers of the circuit board, a first power supply pair being one of the power supply pairs, the first power supply pair between a first power supply island on a first layer and a second power supply island on a second layer, a second power supply pair being one of the power supply pairs, the second power supply pair between the second power supply island and a third power supply pair on a third layer, the second layer between the first layer and the third layer;
   arranging nodes in each of the power supply pairs based on CAD data of the circuit board, first nodes being some of the nodes, the first nodes in the first power supply pair, second nodes being some of the nodes, the second nodes in the second power supply;
   setting the first nodes and the second nodes to the second power supply;
   calculating impedance between the nodes; and
   creating a circuit board power supply noise analysis model based on the calculated impedance between the nodes.

2. The circuit board power supply noise analysis model generating method executed by a computer according to claim 1, wherein
   the extracting the power supply pairs calculates a capacitance value from areas of the power supply pairs, and excludes a power supply pair having a calculated capacitance value of which is equal to or less than a certain value, from a creation target of a power supply noise analysis model.

3. The circuit board power supply noise analysis model generating method executed by a computer according to claim 1, wherein
   the calculating the impedance between the nodes comprises determining whether a power supply island exists in another layer within a certain distance from a link connecting the nodes, and calculating the inductance between the nodes based on a distance from a layer where the link exists to a layer where the power supply island exists when the power supply island exists within the certain distance.

4. The circuit board power supply noise analysis model generating method executed by a computer according to claim 1, wherein
   the calculating the impedance between the nodes comprises
   calculating a midpoint of a link connecting the nodes,
   detecting a power supply island existing in a certain search range with reference to the midpoint, and
   calculating the inductance between the nodes based on a distance from a layer where the link exists to a layer where the power supply island exists when the power supply island is detected.

5. A circuit board power supply noise analysis model generating apparatus, comprising:
   a power supply pair extracting unit to extract power supply pairs, each of the power supply pairs including an overlapping part of power supply islands in different layers of the circuit board, a first power supply pair being one of the power supply pairs, the first power supply pair between a first power supply island on a first layer and a second power supply island on a second layer, a second power supply pair being one of the power supply pairs, the second power supply pair between the second power supply island and a third power supply pair on a third layer, the second layer between the first layer and the third layer;
   a node arranging/projecting unit to arrange nodes in each of the power supply pairs based on CAD data of the circuit board, first nodes being some of the nodes, the first nodes in the first power supply pair, second nodes being some of the nodes, the second nodes in the second power supply, and to set the first nodes and the second nodes to the second power supply;
   an impedance calculating unit to calculate impedance between the nodes set by said node arranging/projecting unit; and
   a model creating unit to create a circuit board power supply noise analysis model based on the calculated impedance between the nodes.

6. The circuit board power supply noise analysis model generating apparatus according to claim 5, wherein
   said power supply pair extracting unit calculates a capacitance value from an area of the power supply pair, and excludes a power supply pair having a calculated capacitance value of which is equal to or less than a certain value, from a creation target of the power supply noise analysis model.

7. The circuit board power supply noise analysis model creating apparatus according to claim 5, wherein
   said impedance calculating unit determines whether a power supply island exists in another layer within a certain distance from a link connecting nodes, and calculates the inductance between the nodes based on a distance from a layer where the link exists to a link where the power supply island exists if the power supply island exists within the certain distance.

8. The circuit board power supply noise analysis model generating apparatus according to claim 5, wherein
said impedance calculating unit calculates a midpoint of a link connecting the nodes, detects a power supply island existing in a certain search range with reference to the midpoint, and calculates the inductance between the nodes based on a distance from a layer where the link exists to a layer where the power supply island exists if the power supply island exists in the certain search range.

9. A non-transitory computer-readable recording medium on which is recorded a circuit board power supply noise analysis model creation program for causing a computer to execute a process, the process comprising:
extracting power supply pairs, each of the power supply pairs including an overlapping part of power supply islands in different layers of the circuit board, a first power supply pair being one of the power supply pairs, the first power supply pair between a first power supply island on a first layer and a second power supply island on a second layer, a second power supply pair being one of the power supply pairs, the second power supply pair between the second power supply island and a third power supply pair on a third layer, the second layer between the first layer and the third layer;
arranging nodes in each of the power supply pairs based on CAD data of the circuit board, first nodes being some of the nodes, the first nodes in the first power supply pair, second nodes being some of the nodes, the second nodes in the second power supply;
setting the first nodes and the second nodes to the second power supply;
calculating impedance between the nodes; and
creating a circuit board power supply noise analysis model based on the calculated impedance between the nodes.

10. The non-transitory computer-readable recording medium according to claim 9, wherein
the extracting a power supply pair calculates a capacitance value from an area of the power supply pair, and excludes a power supply pair, a calculated capacitance value of which is equal to or smaller than a predetermined value, from a creation target of a the circuit board power supply noise analysis model.

\* \* \* \* \*